United States Patent
Bissett et al.

(10) Patent No.: US 8,812,907 B1
(45) Date of Patent: Aug. 19, 2014

(54) FAULT TOLERANT COMPUTING SYSTEMS USING CHECKPOINTS

(75) Inventors: Thomas D. Bissett, Shirley, MA (US); Paul A. Leveille, Grafton, MA (US); Ted M. Lin, Ayer, MA (US); Jerry Melnick, Wayland, MA (US); Angel L. Pagan, Holden, MA (US); Glenn A. Tremblay, Del Mar, CA (US)

(73) Assignee: Marathon Technologies Corporation, Littleton, MA (US)

( * ) Notice: Subject to any disclaimer, the term of this patent is extended or adjusted under 35 U.S.C. 154(b) by 145 days.

(21) Appl. No.: 13/186,087

(22) Filed: Jul. 19, 2011

Related U.S. Application Data

(60) Provisional application No. 61/365,630, filed on Jul. 19, 2010.

(51) Int. Cl.
*G06F 11/00* (2006.01)

(52) U.S. Cl.
USPC .......................................................... 714/20

(58) Field of Classification Search
USPC .......................................................... 714/20
See application file for complete search history.

(56) References Cited

U.S. PATENT DOCUMENTS

| | | | |
|---|---|---|---|
| 4,758,951 A | 7/1988 | Sznyter | |
| 6,397,242 B1 | 5/2002 | Devine et al. | |
| 6,907,477 B2 | 6/2005 | Altman et al. | |
| 6,954,877 B2 * | 10/2005 | Earl et al. | 714/13 |
| 7,080,375 B2 | 7/2006 | Martin | |
| 7,299,337 B2 | 11/2007 | Traut et al. | |
| 7,310,721 B2 | 12/2007 | Cohen | |
| 7,380,039 B2 * | 5/2008 | Miloushev et al. | 710/244 |
| 7,934,035 B2 * | 4/2011 | Miloushev et al. | 710/244 |
| 8,117,496 B2 * | 2/2012 | Bashir et al. | 714/12 |
| 2002/0078308 A1 | 6/2002 | Altman et al. | |
| 2006/0112297 A1 * | 5/2006 | Davidson | 714/2 |
| 2007/0174484 A1 | 7/2007 | Lussier et al. | |
| 2009/0193298 A1 * | 7/2009 | Mukherjee | 714/38 |
| 2010/0325500 A1 * | 12/2010 | Bashir et al. | 714/746 |
| 2011/0161639 A1 * | 6/2011 | Knauth et al. | 712/228 |
| 2011/0167194 A1 * | 7/2011 | Scales et al. | 711/6 |
| 2011/0167195 A1 * | 7/2011 | Scales et al. | 711/6 |

(Continued)

FOREIGN PATENT DOCUMENTS

WO 9926133 A2 5/1999

OTHER PUBLICATIONS

International Search Report under the Patent Cooperation Treaty for PCT Application No. PCT/US06/19754 Search and Examination Report dated Oct. 17, 2007 (3 pages).

(Continued)

*Primary Examiner* — Kamini Patel
(74) *Attorney, Agent, or Firm* — K&L Gates LLP

(57) ABSTRACT

A computer system configured to provide fault tolerance includes a first host system and a second host system. The first host system is programmed to monitor a number of portions of memory of the first host system that have been modified by a guest running on the first host system and, upon determining that the number of portions exceeds a threshold level, determine that a checkpoint needs to be created. Upon determining that the checkpoint needs to be created, operation of the guest is paused and checkpoint data is generated. After generating the checkpoint data, operation of the guest is resumed while the checkpoint data is transmitted to the second host system.

19 Claims, 12 Drawing Sheets

(56) References Cited

U.S. PATENT DOCUMENTS

2011/0167196 A1* 7/2011 Scales et al. ............... 711/6
2012/0011401 A1* 1/2012 Ranganathan et al. ......... 714/19
2012/0084520 A1* 4/2012 Chou et al. .................. 711/162

OTHER PUBLICATIONS

Supplementary European Search Report under Rule 62 of the European Patent Convention for Application No. EP 06 77 0856, Nov. 10, 2010 (6 pages).

Cully et al., "Remus: High Availability via Asynchronous Virtual Machine Replication", The University of British Columbia, Department of Computer Science, 14 pages.

Tamura, Yoshi, "Modernization of Kemari using HVM with PV Drivers", Nippon Telegraph and Telephone Corporation, NTT Cyber Space Labs., Nov. 20, 2008, 23 pages.

Tamura, et al., "Kemari: Virtual Machine Synchronization for Fault Tolerance", NTT Corporation, NTT Cyber Space Laboratories, 2 pages.

Tamura, Yoshi, "Kemari: Virtual Machine Synchronization for Fault Tolerance using DomT", Nippon Telegraph and Telephone Corporation, NTT Cyber Space Labs., Jun. 24, 2008, 19 pages.

Tamura et al., "Virtual Machine Synchronization for High Availability Clusters", Nippon Telegraph and Telephone Corporation, NTT Cyber Space Labs., Apr. 17, 2007, 17 pages.

* cited by examiner

| vcpu | Replication Engine State | | | |
|---|---|---|---|---|
| | Idle | Capture | Transfer | Commit |
| 0 | Initiate Cycle | PT Reset; State Capture | Pack and Send | Release Buffered IO |
| 1 | | Compare/Copy | | |
| 2 | | Compare/Copy | | |
| 3 | | Compare/Copy | | |

FIG. 8

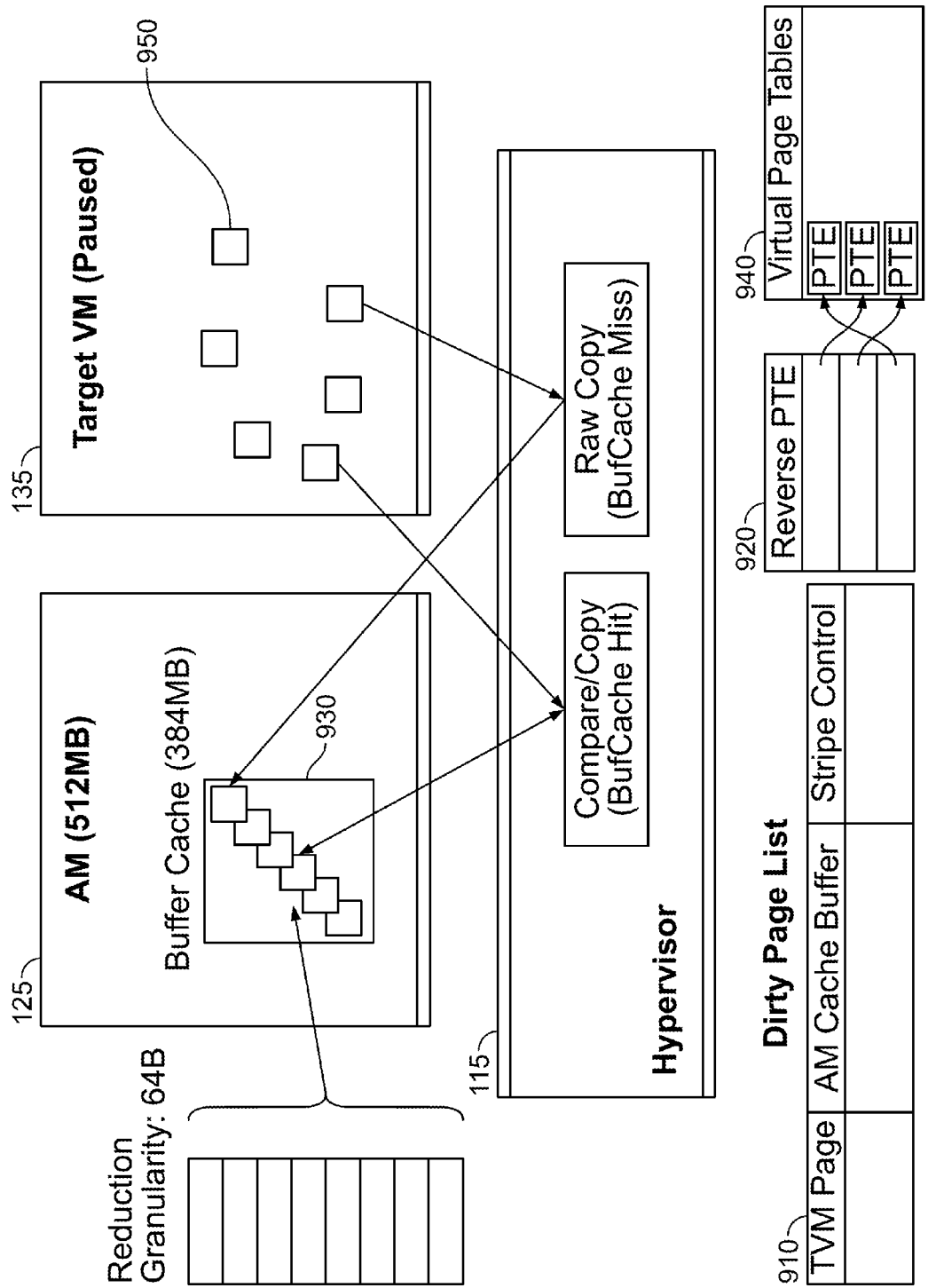

FAULT TOLERANT COMPUTING SYSTEMS USING CHECKPOINTS

CROSS REFERENCE TO RELATED APPLICATION

This application claims priority to U.S. Provisional Application No. 61/365,630, filed Jul. 19, 2010 and titled "FAULT TOLERANT COMPUTING SYSTEMS USING CHECKPOINTS," which is incorporated by reference.

TECHNICAL FIELD

This invention relates to computing systems, and more particularly to fault tolerant computing systems.

BACKGROUND

Fault-tolerance may be viewed as the ability to achieve desired results despite a failure in the system producing those results. A fault-tolerant computing system continues to operate properly in the event of failure of, or faults within, one or some subset of its components.

Some techniques for fault tolerance are based on separating the functionality of a standard server into compute activity and I/O activity. Compute activity is inherently synchronous. Transformations being done on data is deterministic in the number of instructions required to transform that data. I/O activity is inherently asynchronous. I/O activity is dependent on factors such as disk latency, timer ticks, Ethernet packet arrivals and video refresh rates. Verification of the correct operation of a compute environment can be done by comparing the current state of two compute environments.

Another approach to fault tolerance is to employ a checkpoint/restart system in which a primary system periodically transfers the state of the primary system to a secondary, backup system at times that may be referred to as checkpoints. In the event of a failure in the primary system, control may be switched to the secondary system, which may restart operation beginning at the last checkpoint.

SUMMARY

In one general aspect, a computer system configured to provide fault tolerance includes a first host system and a second host system. The first host system is programmed to monitor a number of portions of memory of the first host system that have been modified by a guest running on the first host system and, upon determining that the number of portions exceeds a threshold level, determine that a checkpoint needs to be created. Upon determining that the checkpoint needs to be created, operation of the guest is paused and checkpoint data is generated. After generating the checkpoint data, operation of the guest is resumed and the checkpoint data is transmitted to the second host system. Operation of the guest is resumed while the checkpoint data is being transmitted to the second host system.

Implementations may include one or more of the following features. For example, the first host system may be a multi-processor system and may employ multiple processors in generating the checkpoint data.

The checkpoint data may include data corresponding to all portions of memory of the first host system that have been modified since a previous checkpoint was generated, and also may include data representing an operating state of the first host system.

The first host system also may determine that a checkpoint needs to be created based on network I/O activity of the guest running on the first host system, or when the duration of a time period since a last previous checkpoint was created exceeds a specified level.

The first host system may be programmed to monitor a number of portions of memory of the first host system that have been modified by a guest running on the first host system by setting permissions for all pages of memory to be read only such that a fault is generated when a page is accessed for modification, and, in response to a fault generated by attempted modification of a page of memory set to be read only, adding the page to a list of pages that have been modified, setting the permissions for the page to be read/write, and allowing the modification to proceed. The first host system may be further programmed to add an entry corresponding to the page to a list that is used in setting permissions for all pages of memory to be read only when a checkpoint is generated.

In another general aspect, a computer system configured to provide fault tolerance includes a first host system and a second host system. The first host system is programmed to monitor network I/O activity by a guest running on the first host system and, upon determining that a threshold level of network I/O activity has occurred, determine that a checkpoint needs to be created. Upon determining that the checkpoint needs to be created, operation of the guest is paused and checkpoint data is generated. After generating the checkpoint data, operation of the guest is resumed and the checkpoint data is transmitted to the second host system. Operation of the guest is resumed while the checkpoint data is being transmitted to the second host system.

The details of one or more implementations are set forth in the accompanying drawings and the description below. Other features and advantages will be apparent from the description and drawings, and from the claims.

DESCRIPTION OF DRAWINGS

FIG. 8 illustrates the roles played by different processors of an AM.

FIG. 9 illustrates mechanisms used to track modified pages in the TVM.

Like reference symbols in the various drawings indicate like elements.

DETAILED DESCRIPTION

Figure 1:
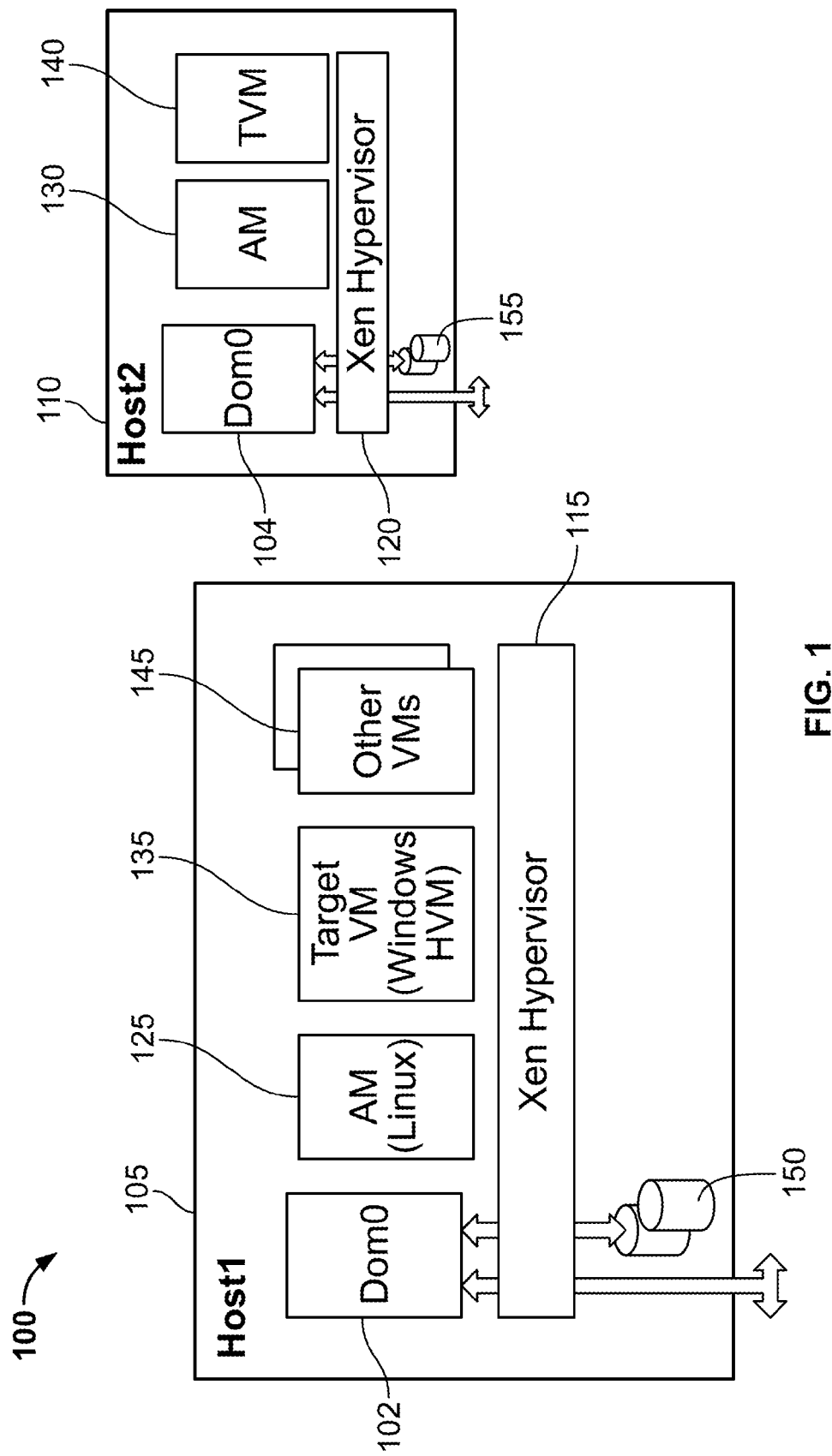
FIG. 1 is a block diagram of a fault tolerant computer system.

Referring to FIG. 1, a fault tolerant computing system 100 includes a first host system (Host1) 105 and a second host system (Host2) 110. Each of the host systems is based upon a symmetric multi-processor (SMP) hardware system that employ multiple processors running in parallel to provide a virtual environment in which application software may be run. The system 100 is a checkpoint-based fault tolerant SMP system that includes a SMP virtual computer that provides a guest environment in which a guest operating system and workload (i.e., applications) run. The guest environment is monitored by two primary systems: a hypervisor and an availability manager (AM). The AM is a component particular to the fault tolerant computing system.

The term "hypervisor" may be used to describe processes and techniques that allow multiple operating systems to run concurrently on a single computer. In one implementation, the hypervisor is provided by Citrix XenServer. XenServer allows simultaneous multiple guest operating systems (including popular distributions of Linux and versions of Microsoft's Windows) to run as independent virtual platforms. For the purposes of this document, two major components of Citrix XenServer will be discussed. The hypervisor is the part of XenServer that is involved in isolating the instruction streams of the virtual platforms from the resources of the physical platform. For example, the hypervisor traps attempts to access physical memory or I/O devices and provides a response consistent with the specification of the virtual platform. Any access that is then needed by a virtual platform to a resource of the physical platform is through a privileged guest operating system domain called Dom0 (domain zero). For example, access to a virtual disk drive is handled by Dom0 where the disk is emulated using a file structure on one of the physical disks.

Each of the host systems 105 and 110 includes a system domain (Dom0) 102 or 104 and runs a hypervisor 115 or 120, an AM 125 or 130, and a target virtual machine (TVM) 135 or 140. Each of the hosts also may run other virtual machines 145. In addition, each of the host systems includes disks 150 or 155 for storage. The hypervisors 115 and 120 provide control of the different processes and operating systems running on the host systems 105 and 110, the TVMs 135 and 140 provide the virtual environment in which an operating system and associated applications can be run, and the AMs 125 and 130 provides the functionality needed to support fault tolerance. To this end, the AMs 125 and 130 on the two host systems 105 and 110 communicate with one another to periodically update the TVM 140 on Host2 110 with the state of the TVM 135 on Host1 105 so that Host2 110 will be able to take over operation of the processes running in the TVM 135 of Host1 105 in the event of a failure in Host1 105.

Stated more generally, the guest state (i.e., the state of the TVM 135 on Host1 105) is copied over to a second virtual environment (i.e., the TVM 140 on Host2 110) as a checkpoint. The management of the checkpoint context by the AMs 125 and 130 is such that the second virtual environment can take over operating the guest environment at any checkpoint boundary without the loss of any active transactions.

In general, the system 100 of FIG. 1 operates consistently with a traditional checkpoint/restart system in which a slave or hot backup system can take over the operation of the online system simply by starting from the last checkpoint and applying a journal of uncompleted I/O activities against that starting state. However, traditional checkpoint/restart systems rely on both a heavily modified operating system and custom applications, where the operating system is responsible for the checkpoint snapshots and the application is responsible for coordinating the journaling activity.

By contrast, the system 100 of FIG. 1 uses modified hypervisors 115 and 120, driver level I/O interception, and the AMs 125 and 130 to provide the checkpoint/restart and journaling features. The operating system and applications remain unmodified from a non-fault tolerant environment. This provides a simple and efficient mechanism for making any application fault-tolerant.

One implementation of the system 100 of FIG. 1 uses a checkpoint/restart architecture on top of a high availability I/O subsystem such as is provided by Marathon Technologies Corp. The checkpoint/restart system is implemented as a collection of hypercall extensions in the hypervisor 115 being controlled by the AM 125, where a hypercall is a call made from the guest software into the hypervisor. In one implementation, the following hypercalls are provided:

MODIFIED_PAGE_CONTROL//Enable, disable, reset page tracking

MODIFIED_PAGE_REGISTER//Register the modified page list array

GET_MODIFIED_PAGE_COUNT//Read current modified page count

GET_MODIFIED_PAGES//Compare/Copy modified pages from target VM

PUT_MODIFIED_PAGES//Push modified pages to standby target VM

GET_DOMAIN_STATE//Fetch domain state for target VM

PUT_DOMAIN_STATE//Write domain state for target VM

RESUME_DOMAIN//Unpause target VM

MODIFIED_PAGE_SET_THRESHOLDS//Set threshold for modified page alert

Calls employing the hypercall extensions are made by the AM 125, which is aware that it is operating on a virtual machine. The high availability I/O subsystem is implemented as guest device drivers talking to the AM 125.

The AMs 125 and 130 and the TVMs 135 and 140 may be based on different operating systems. For example, the AMs 125 and 130 may be based on a Linux operating system, while the TVMs 135 and 140 are based on a Windows operating system.

Checkpoint Engine

Figure 2:
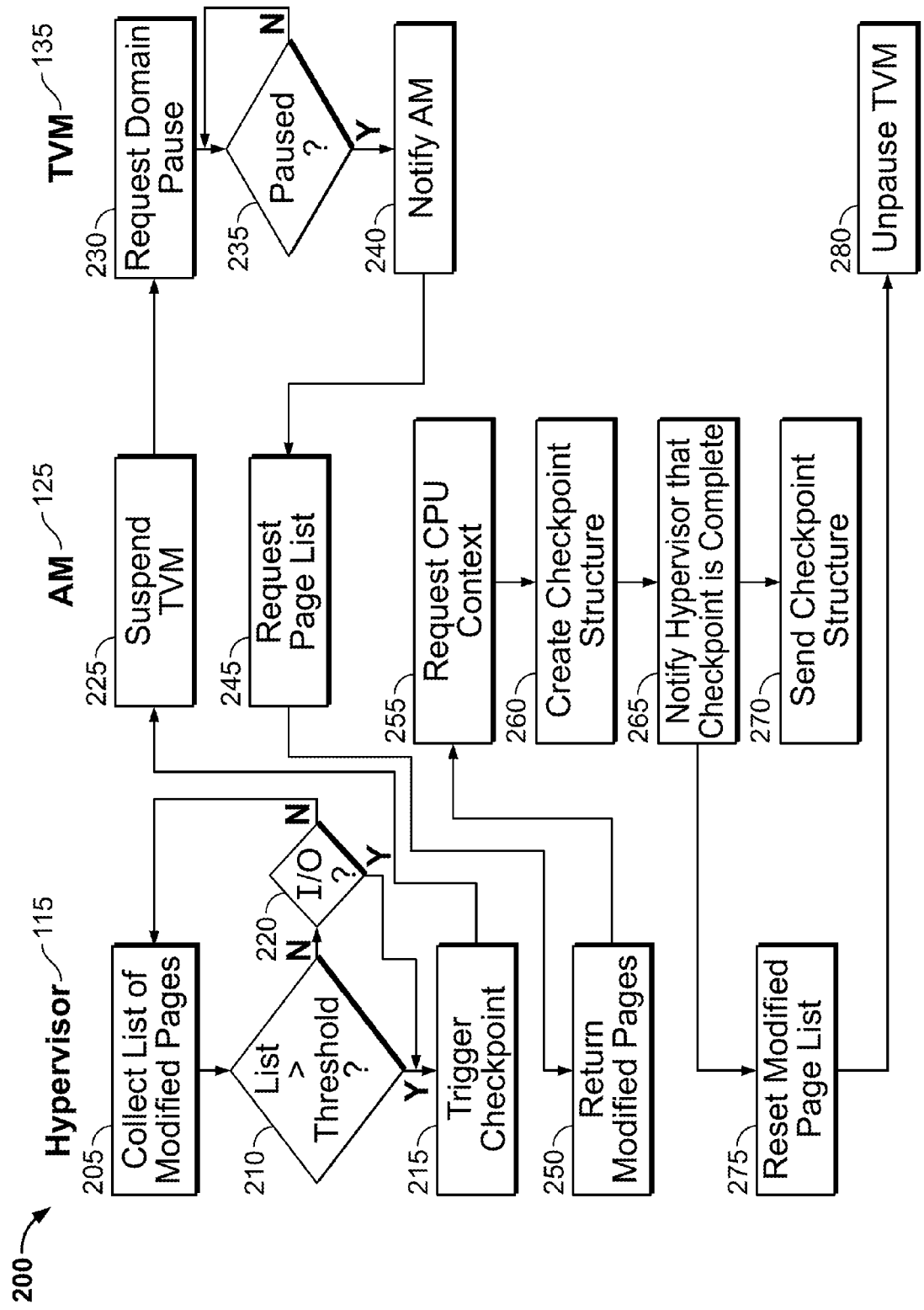
FIG. 2 is a flow chart of a procedure implemented by the system of FIG. 1.

Referring to FIG. 2, checkpoints are processed according to a procedure 200. In order to create an accurate checkpoint, and to efficiently transmit the checkpoint information between hosts 105 and 110, the hypervisor 115 collects a list of pages of memory that the TVM 135 is modifying (step 205). In one implementation, the mechanism employed to collect the list of pages that have been modified (also referred to as "dirty" pages) is to set all of the pages of memory to be read only such that a fault is generated when a page is accessed for modification. In response to the fault, the hypervisor adds the page to the list of pages that have been modified, sets the permissions for that page to permit read/write access, and allows the modification to proceed.

In addition, the hypervisor adds an entry corresponding to the page to a list that points back to the page table structure and is used in resetting the pages to all be read only when a checkpoint is generated. This list permits a quick reset of the page table structure which allows the TVM to quickly return to operation once a checkpoint is generated.

In some implementations, the hypervisor also must account for the impact of video on the page table structure. In particular, implementations that have multiple virtual machines sharing a single video card often use an area of memory to provide a virtual video card, and rely on the page table structure to show which portions of that area of memory have been modified in order to determine which portions of the video display need to be updated. To account for this, the hypervisor maintains a second list of pages that have been modified and are included in the video area of the memory, and maintains this second list independent of the checkpoint structure so that it is available for use in video processing.

When the size of the list exceeds a threshold level (step 210), the AM 125 is notified that a checkpoint should be triggered (step 215). For example, in one implementation, a checkpoint is triggered when 6000 pages of memory have been modified. A checkpoint also may be triggered by I/O activity (step 220). In addition, a checkpoint may be generated when a certain period of time (e.g., 100 milliseconds) has passed since the last checkpoint was generated.

In response to the notification, the AM 125 notifies a paravirtualized ("PV") driver in the TVM 135 to suspend itself (step 225). The PV driver is a system component that passes I/O requests to the hypervisor 115. Upon sending an I/O request, the TVM 135 may be suspended until a response to the I/O request is received.

The PV driver responds by requesting a domain pause (step 230), confirming that the domain has been paused (step 235), and notifying the AM that the domain is paused (step 240). The AM 125 responds by requesting the modified page list from the hypervisor 115 (step 245). In particular, the AM 125, which generally operates in a multi-threaded mode at this point, requests a compare/copy of the AM modified page cache with the TVM memory. In response, the hypervisor 115, which also generally operates in a multi-threaded mode at this point, returns sections of pages that differ from the AM cache (step 250), with the cache being compared to the TVM memory on a 64 byte basis. For any block that differs, the TVM memory is copied into the AM cache. For each page (e.g., 4096 bytes), a flag word is returned designating the byte blocks that were copied.

The AM 125 then requests CPU context information (step 255) and creates a checkpoint packet structure using the CPU context information and the data returned by the compare/copy process (step 260). The AM 125 then notifies the hypervisor 115 that creation of the checkpoint is complete (step 265) and provides the checkpoint data to the AM 130 running on the second host system (Host2) 110 (step 270).

Upon receiving the notification that the creation of the checkpoint is complete, the hypervisor 115 resets the modified page list tracking mechanism (step 275) and instructs the AM 125 to unpause the TVM 135 (step 280), which resumes operation in parallel with the ongoing transmission of the checkpoint data to the AM 130.

A compression algorithm can be run on the checkpoint data using known compression techniques. In general, this on-the-fly compression overlaps with transmission and does not add latency. Compression algorithms can be run in the background using other processors to obtain considerable time savings.

I/O Processing

The AM 125 handles device state to provide seamless fail-over. The system 100 is configured to keep the checkpoint state and the I/O state of the TVM 135 consistent. Failing over to the secondary system 110 implies starting the secondary system 110 from the last valid checkpoint with an I/O state that preserves the state of active transactions. To this end, the secondary system 110 does pre-checkpoint I/O writes upon receiving a new checkpoint. The secondary system 110 only performs I/O reads after the secondary system 110 has been activated following a failure in the primary system 105.

For Ethernet, redundant connections are maintained into the network. Using a soft-settable MAC address, either system 105 or 110 can transmit and receive messages on behalf of the guest software running on the TVM 135 or 140. Ethernet transmissions are visible externally to the system and as such represent part of the visible state for active transactions.

To account for this, no Ethernet traffic is allowed to leave the system until the checkpoint that follows the requested Ethernet output has been received by the secondary system 110.

For disks, the AM 125 manages disk mirroring. The disk drives accessed by the guest software running on the TVM 135 are mirrored on each of systems 105 and 110 such that each system has a local copy of the disk drive. One way this is accomplished is to treat a disk write like Ethernet and tightly tie the disk write to a checkpoint. This, however, may come with severe performance penalties. To avoid these penalties, and because the disk is local, the disk is treated as part of the internal state of the guest software running on the TVM 135. In particular, disk operations on the primary system 105 are allowed to complete normally, while disk operations are queued on the secondary system 110. Upon receiving a new checkpoint, the secondary system 110 is allowed to process queued disk operations up to that checkpoint. In the event of a failover, the former secondary AM 130 completes all queued disk operations up to the last checkpoint and discards all disk operations received after that check point before initiating operation of the guest software running on the TVM 140.

The AM 125 includes software components called the transaction synchronization layer (TSL) and device synchronization layer (DSL). The TSL and DSL are responsible for providing transaction integrity across device and system transitions. The TSL is responsible for routing a transaction request according to the state of the fault tolerant machine. The DSL is responsible for routing the requests based on the state and type of the I/O device that is being handled. The DSL handles devices based on the I/O policy for each device, where the different I/O policies include single-ended, active/standby, single responder, and active/active.

As an example, Ethernet input is queued to both the primary system 105 and the secondary system 110. Ethernet is an active/standby device. The network data arrives at the active device. The DSL provides this input data to the TSL. The TSL replicates the data and forwards it to both the primary system and the backup system, regardless of the system in which the active Ethernet device resides. The AM 125 on the primary system 105 delivers the Ethernet data to TVM 135, and the next checkpoint that is generated represents the state of TVM 135 after consuming the Ethernet data. The secondary system 110 discards the Ethernet input upon reception of the checkpoint following consumption of the data included in the Ethernet input by the primary system 105. A failover to the secondary system 110 prior to that checkpoint will start the secondary TVM 140 with a guest state before the input was consumed. AM 130 on secondary system 110 applies the Ethernet data to TVM 140 and starts execution.

Disk read data is treated differently. Disks are active/active devices. Disk read requests from primary TVM 135 are received in primary AM 125. The TSL in AM 125 replicates the request to the DSL in primary AM 125 and the DSL in secondary AM 130. Because the disk is an active/active device, the DSL in AM 125 and the DSL in AM 130 initiate the read on both the primary system and the secondary system. This dual read is performed to verify the integrity of the mirror disk. A checksum can be produced from both data sets by the DSL, and the checksums can be compared in the TSL. The disk data from the primary system 105 can then be given to TVM 135 to process.

This simplified algorithm impacts performance by making every disk read wait for the secondary system 110 to return data before the disk data can be processed. A performance enhancement assumes that the disk data will compare. The TSL in AM 130 returns an early response marker for every disk read operation. This is an acknowledgement that the disk read request has been queued in secondary system 110.

Early response markers are used to decouple disk activity from rigid checkpoint boundaries, with secondary disk activity being used to control checkpoints and the early response markers. The primary system 105 can forward disk data to TVM 135 as soon as the disk data is available. The TSL in AM 125 produces a checksum for the disk data and forwards the checksum to the TSL in AM 130. The next checkpoint of TVM 135 will represent the state of TVM 135 after consuming the disk data.

On the completion of a checkpoint, all disk reads that the primary system 105 completed prior to that checkpoint are completed on the secondary system 110. The TSL generates a checksum for the disk data and compares that against the checksum from AM 125. If the comparison fails, the secondary disk is faulted out of the system.

On a failover, the AM 130 in the former secondary system 110 removes any read requests in its queue that were generated by the primary system 105 after the last successful checkpoint. These requests will be regenerated by the guest software running on the TVM 140 of the secondary system as that software resumes operation from the last successful checkpoint.

The former secondary AM 130 then queues any former primary read requests that remain to the disk system on the former secondary system 110. These represent outstanding read requests that occurred in prior completed checkpoints.

As noted above, checkpoints can be triggered by I/O activity (step 220) in addition to modified page thresholds (step 210). Network performance is very sensitive to latency. The minimum latency can be achieved by immediately declaring a checkpoint whenever dealing with network I/O. However, this is not always the best answer, since a checkpoint takes time to generate and the guest software running on the TVM 135 is paused while the modified page list is being processed. Stated another way, there is an overhead factor involved in generating a checkpoint. In addition, not all network traffic is important. For example, TCP/IP ACK packets are noise level and can be held off until something more important needs to be sent.

Also, with multiple processors running in the TVM 135, more than one thread can be generating network traffic. Since small delays in processing a network send can reap huge savings in overhead, the system 100 is configured, in general, to batch several sends on top of the same checkpoint.

Disk traffic can also trigger a checkpoint. Disk writes are allowed to be issued to the disk of the primary TVM 135 without a checkpoint. Disk read data can also be consumed and completed without waiting for a checkpoint. However, all of the processing of disk operations by the secondary system 110 is based on the occurrence of checkpoints. The secondary system 110 must maintain a queue of disk read operations and buffer all disk write operations. The larger the secondary buffer, the longer it will take the secondary system to catch up on a checkpoint failover.

In view of this, a checkpoint is declared based on a threshold level of modified pages in the TVM 135, network send activity, and outstanding disk activity. This results in a checkpoint algorithm that is responsive to guest software loads in the TVM 135 rather than being rigidly defined by a single activity.

Figure 3:
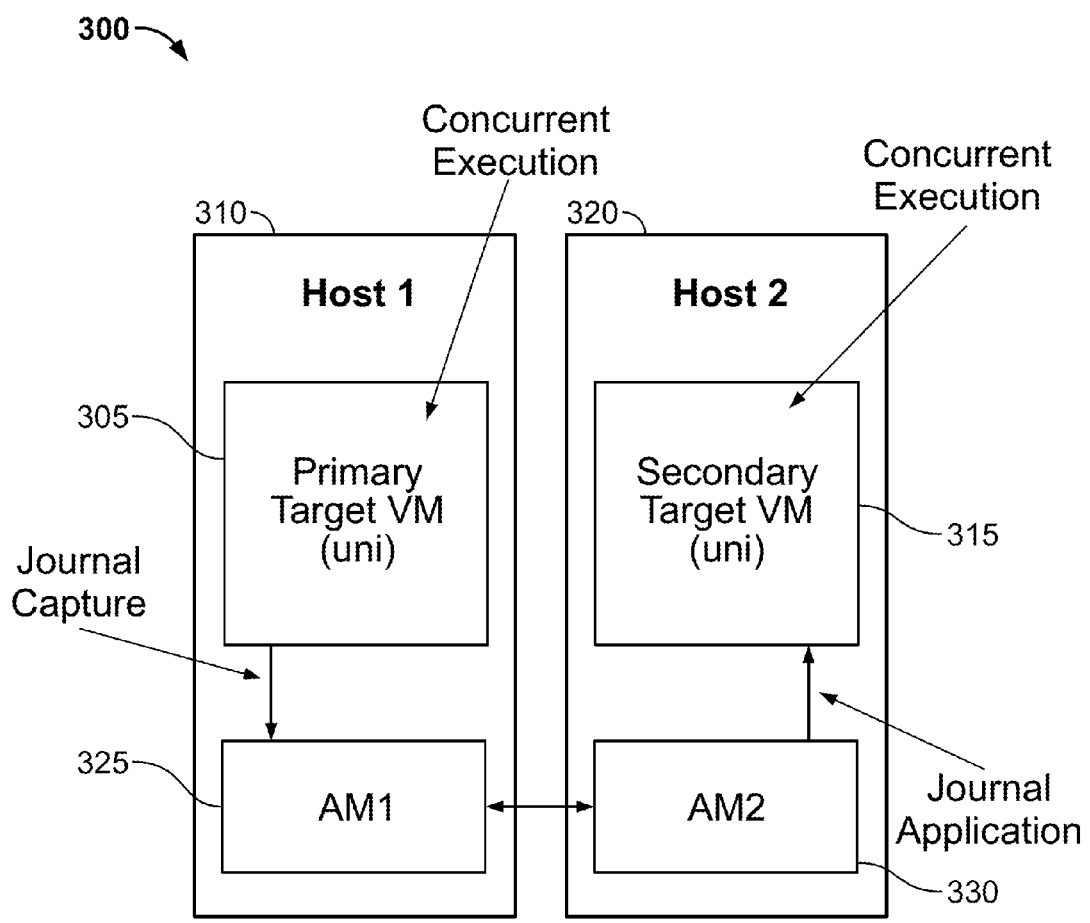
FIG. 3 is an operational diagram of a system that operates in instruction lockstep.
Figure 4:
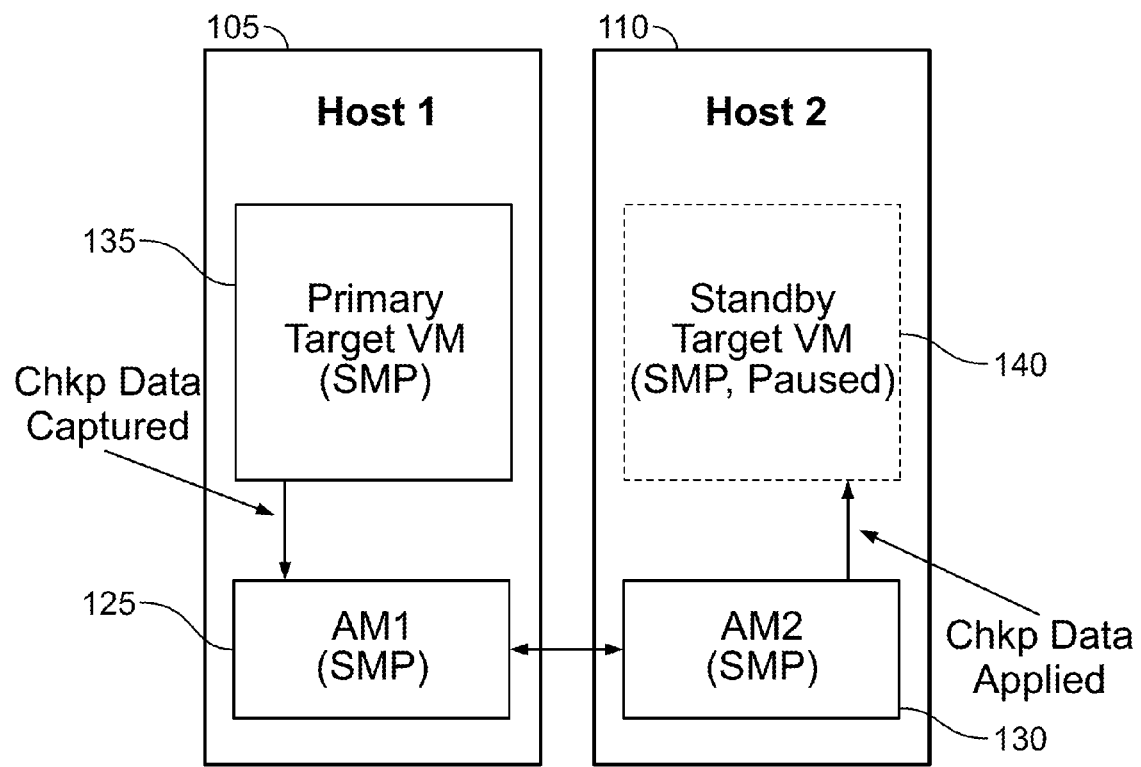
FIG. 4 is an operational diagram of a system that operates using checkpoints.

FIGS. 3 and 4 may be compared to show operation of the system 100 relative to a system that employs processor lockstep.

FIG. 3 shows a system 300 that operates in lockstep, with a primary TVM 305 on a first host system Host1 310 and a secondary TVM 315 on a second host system Host2 320 concurrently executing the same software. AM1 325 on the first host system 310 uses a journaling function to capture I/O and other asynchronous events by the primary TVM 305, and provides the journal data to AM2 330 on the second host system 320, which applies the journal data to the secondary TVM 315. In general, the data flow from AM1 325 to AM2 330 is journal data, while the data flow from AM2 330 to AM1 325 is acknowledgement flow control data. The connection between AM1 and AM2 has relatively low bandwidth (e.g., 1 MB/s to 100 MB/s). Each of AM1 325 and AM2 330 may be implemented as a Linux appliance running on a single virtual CPU.

By contrast, FIG. 4 shows a system that employs checkpoints and replication, with the secondary TVM 140 being paused while the primary TVM 135 is operational. AM1 125 on Host1 105 captures checkpoint data as discussed above, and provides the checkpoint data to AM2 130 on Host2 110, which applies the checkpoint data to the secondary TVM 140. In general, the data flow from AM1 125 to AM2 130 is checkpoint data, while the data flow from AM2 130 to AM1 125 is acknowledgement flow control data. The connection between AM1 125 and AM2 130 has relatively high bandwidth (e.g., 100 MB/s to 1000 MB/s or more).

Figure 5:
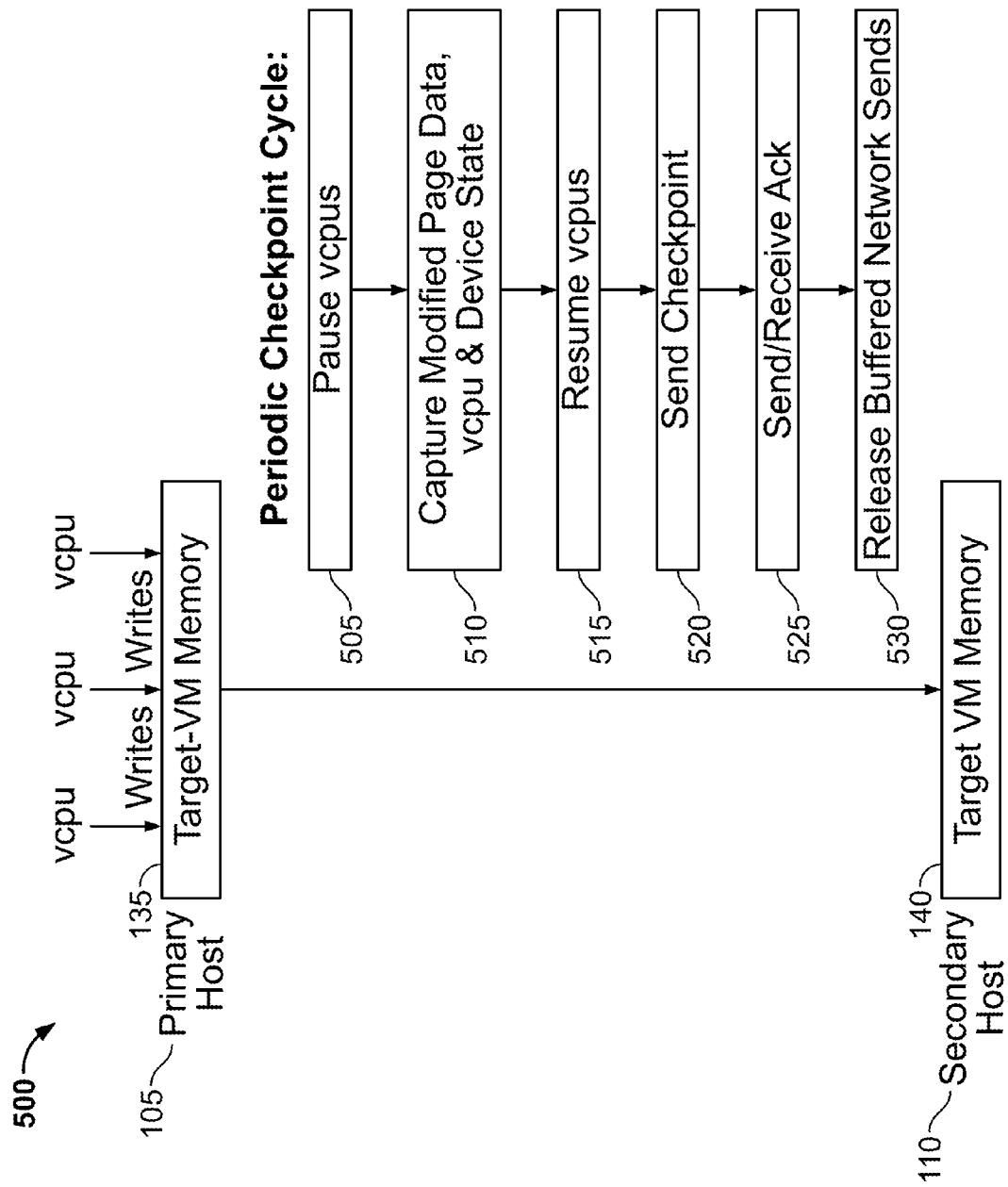
FIG. 5 illustrates a process by which memory of a secondary TVM is aligned with memory of a primary TVM.

FIG. 5 illustrates the process 500 by which memory of the secondary TVM 140 on the secondary host 110 is aligned with the memory of the primary TVM 135 on the primary host 105. As shown, the process involves pausing the virtual CPUs of the primary TVM 135 (step 505) and capturing their modified page data, virtual CPU states, and device states to form a checkpoint (step 510). Operation of the virtual CPUs then is permitted to resume (step 515) and the checkpoint is sent to the TVM 140 (step 520). Upon receipt of an acknowledgement of the checkpoint (step 525), any buffered network sends are released (step 530).

Figure 6:
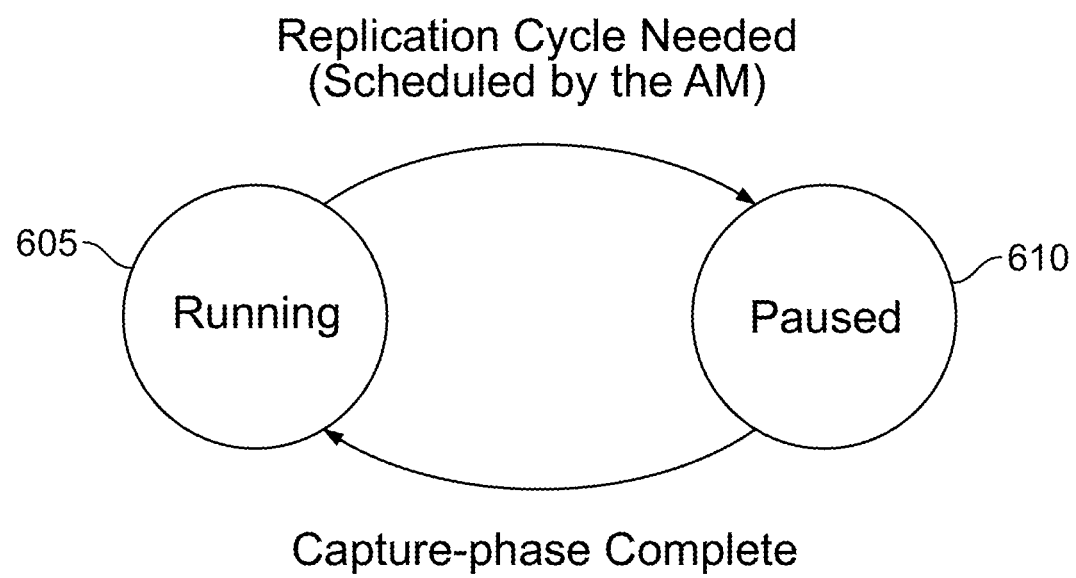
FIG. 6 illustrates the operational states of a primary TVM.

FIG. 6 illustrates the operational states of the primary TVM 135. As shown, the primary TVM 135 operates in a running state 605 until the AM 125 indicates that a replication cycle is needed, at which point the primary TVM 135 switches to a paused state 610 while the checkpoint data is captured. All of the virtual CPUs of the primary TVM must be paused before data capture for the checkpoint is completed. Once data capture is completed, the primary TVM returns to the running state 605.

As noted above, network send operations are buffered in the AM 125 until the replication cycle completes. Accordingly, rapid cycles are important to reduce network latency, though, as discussed above, the overhead resulting from the replication cycles makes rapid replication cycles problematic for compute-intensive operations. In one implementation, to balance these competing factors, the AM 125 may initiate a checkpoint cycle when the previous checkpoint cycled has completed and either 100 ms of time has elapsed, the modified page count has reached approximately 6,000, or buffered network-sends exist and the rate of arrival slows.

Figure 7:
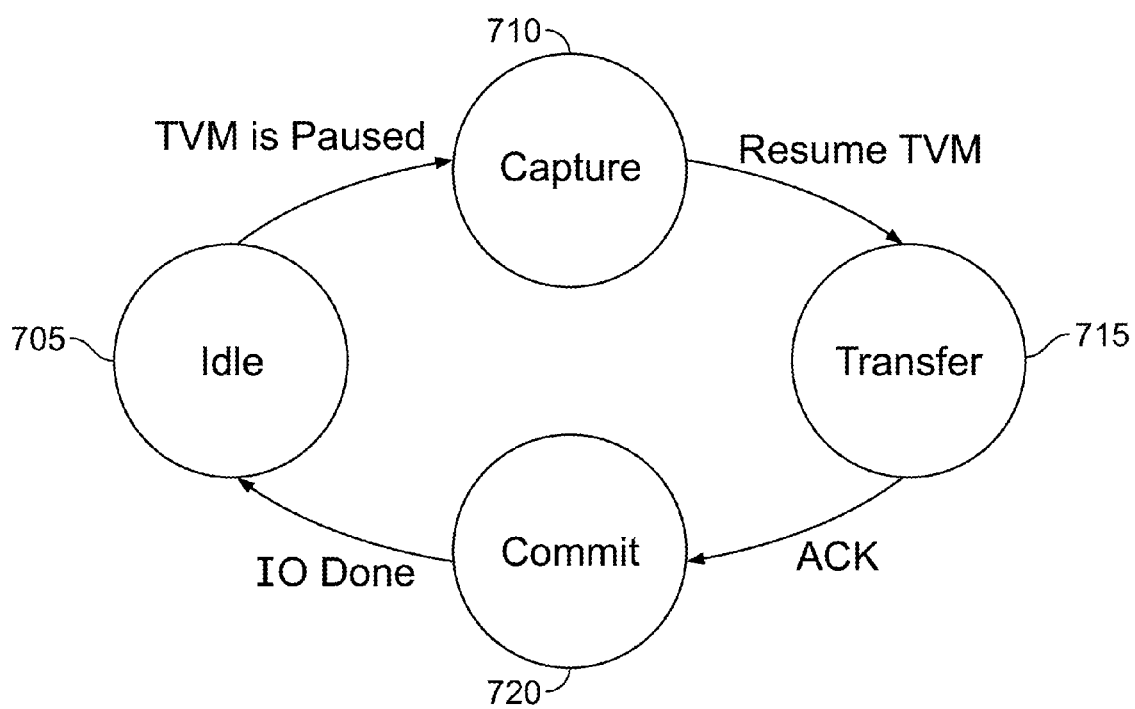
FIG. 7 illustrates the operational states of a replication engine.

FIG. 7 illustrates the major operational states of the replication engine in the AM 125. The engine starts in an idle state 705 until a checkpoint is needed, at which point the TVM 135 is paused and the replication engine moves to a capture state 710 in which checkpoint data is captured. Once capture is complete, operation of the TVM is resumed and the replication engine moves to a transfer state 715 in which the checkpoint data is transferred to the secondary system 110. Upon receiving an acknowledgment from the secondary system 110, the replication engine enters a commit state 720 where it remains until I/O is done and the replication engine returns to the idle state 705.

FIG. 8 illustrates the roles played by different processors (vcpus) that make up the AM 125. In the implementation shown in FIG. 8, the AM 125 includes four vcpus. The first of these (vcpu 0) operates in all of the operational states of the AM 125. In particular, vcpu 0 initiates the capture state from the idle state 705, performs the page threshold reset and the state capture during in the capture state 710, packs and sends the checkpoint date in the transfer state 715, and releases the buffered I/O data in the commit state 720. As shown, the AM 125 generally only operates in a multi-threaded mode during the capture phase where the second through fourth vcpus of the AM 125 are tasked with comparing and copying data while the TVM 135 is paused. In one implementation, capture times are on the order of one microsecond per modified page for the page threshold reset, 50 microseconds for state capture, and one microsecond per modified page for comparing/coping the modified page.

FIG. 9 illustrates the mechanisms used to track dirty pages in the TVM 135. AM 125 registers a dirty page list 910 with the hypervisor 115. Each entry in the dirty page list 910 includes three fields: a pointer into guest memory, a pointer into the buffer cache of the AM 125, and stripe control bits (described below). Thus, the dirty page list is a collection of pages contained in AM memory that will hold TVM page references, AM buffer cache references, and stripe control bits. The hypervisor creates a reverse page table entry (PTE) list 920 that will contain pointers back into the hypervisor-controlled memory paging structure for the TVM 135. The reverse PTE list is sized to match the dirty page list on the approximation that every dirty page of TVM memory is unique. The AM 125 also registers a notification alert with the hypervisor that instructs the hypervisor to notify the AM 125 if the dirty page list 910 or the reverse PTE list 920 exceeds a certain threshold of fullness. Additionally, the AM 125 can instruct the hypervisor to implement a TVM execution yield if either list exceeds the 80% full mark.

Figure 10A:
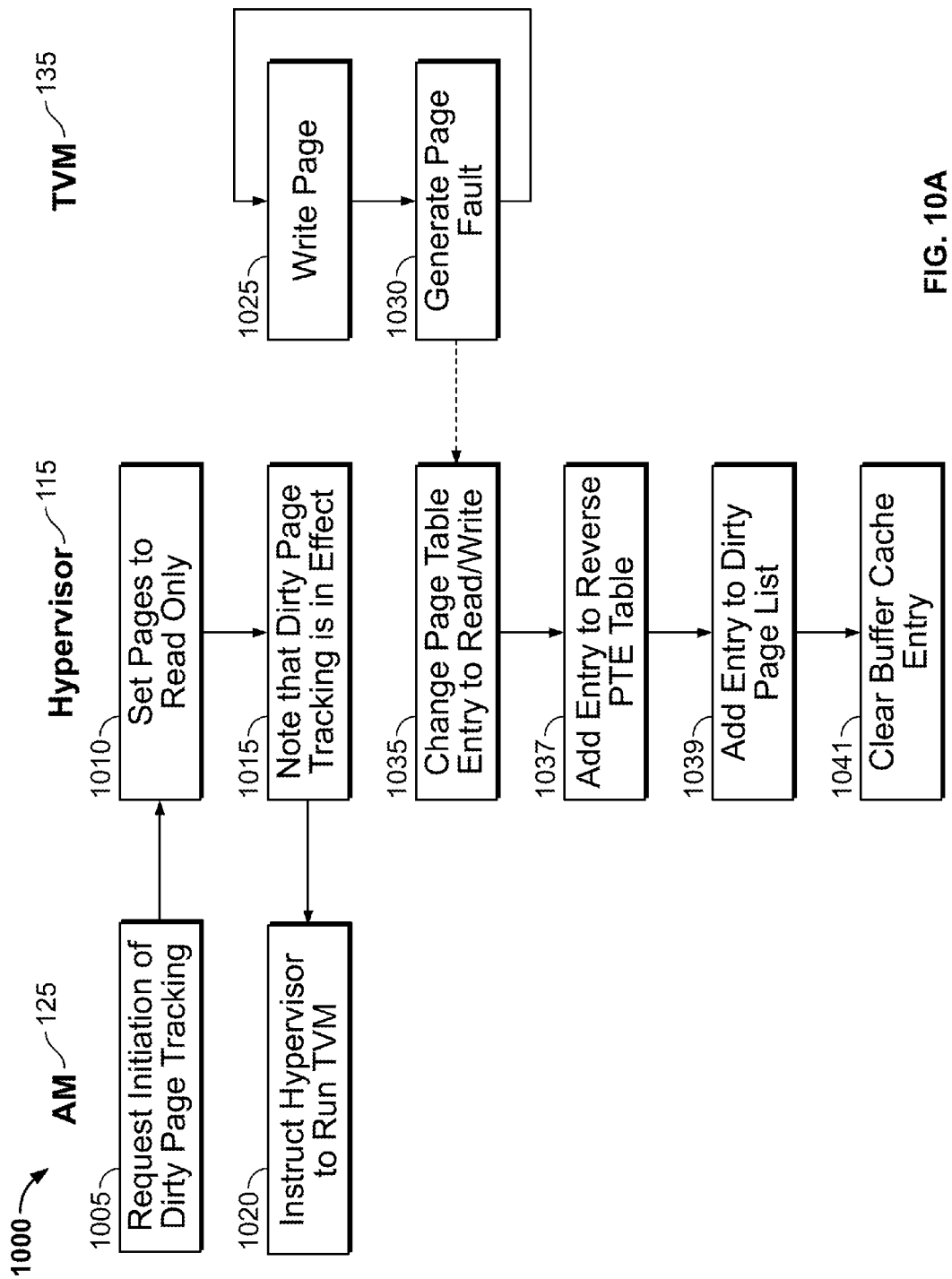
FIGS. 10A-10C are flow charts of a procedure used to track modified pages.
Figure 10B:
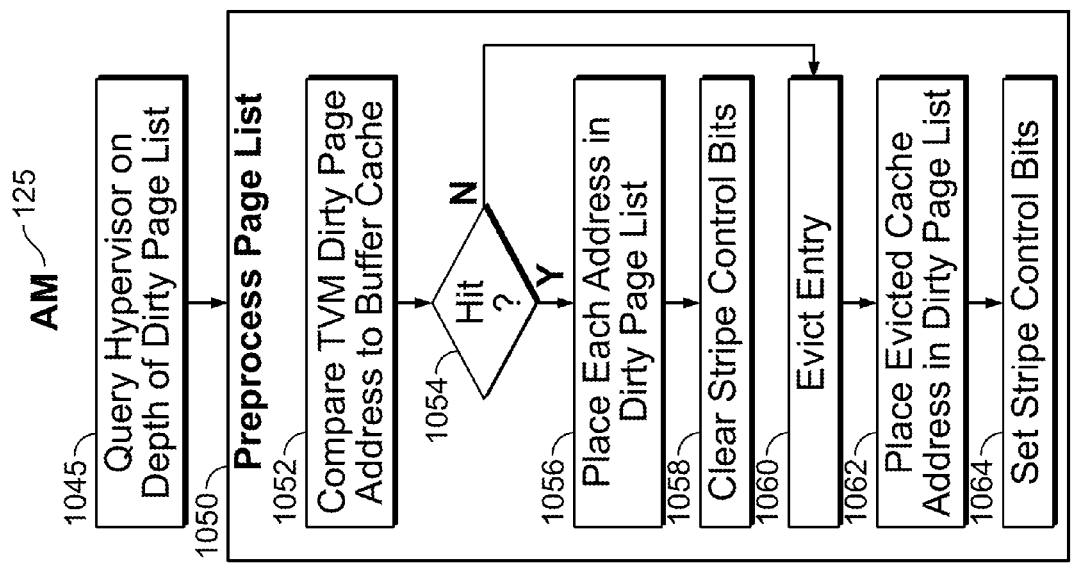
Figure 10C:
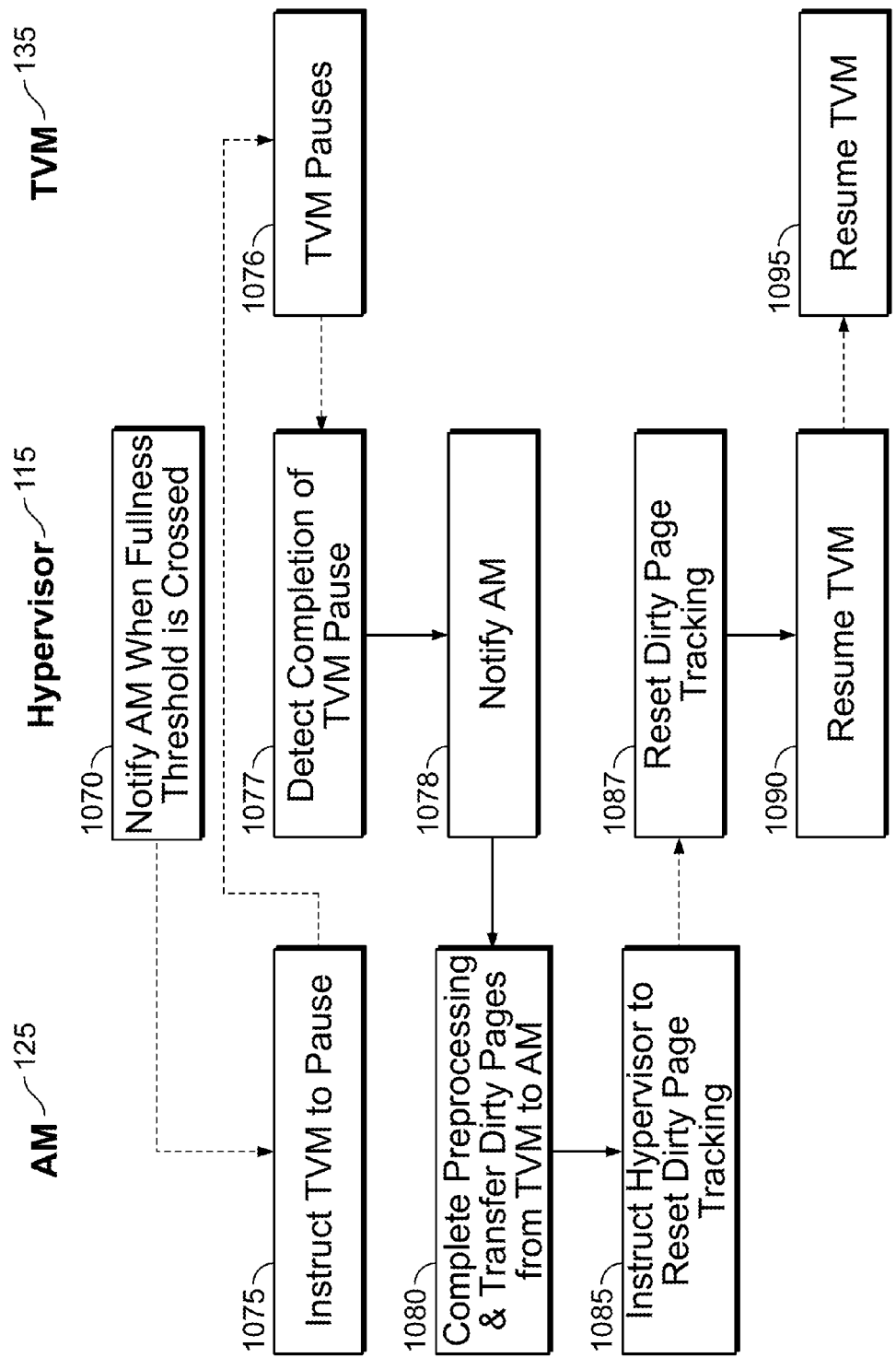

Referring also to FIGS. 10A-10C, these mechanisms may be used to provide dirty page tracking according to a procedure 1000. Initially, the AM 125 requests initiation of dirty page tracking (step 1005). In response, the hypervisor reviews the entire page table structure maintained by the hypervisor for the TVM 135 and changes the permissions for every page to Read Only (step 1010). In addition, unused bits in the hardware page table structure are set to indicate that the Read Only status has been done for dirty page tracking (step 1015). AM 125 then instructs the hypervisor 115 to start running TVM 135 (step 1020). The first time a page of memory 950 in TVM 135 is written (step 1025), a page fault is sent back to the hypervisor 115 (step 1030) and the TVM 135 continues execution until the next page fault occurs.

In response to the page fault, the hypervisor changes the page table entry 940 from Read Only to Read/Write (step 1035), adds an entry to the reverse PTE table 920 pointing to the page table entry just modified (step 1037), adds an entry to the dirty page list 910 that points to the page of memory 950 in TVM 135 (step 1039), and clears the corresponding pointer to the buffer cache 930 in the dirty page list 910 (step 1041).

The AM 125 operates in parallel to the TVM 135. The AM queries the hypervisor 115 on the depth of the dirty page list (step 1045) and also begins preprocessing the dirty page list 910 (step 1050). As part of the preprocessing, the AM 125 compares the TVM dirty page address to the contents of the Buffer Cache 930 of the AM 125 (step 1052). When a hit in the cache is found (step 1054), the cache address is placed in the dirty page list 910 (step 1056), and the stripe control bits are cleared (step 1058). Otherwise, when a hit in the cache is not found, an entry in the buffer cache 930 of the AM 125 is evicted using well known caching algorithms (step 1060), that evicted buffer cache address is placed in the dirty page list 910 (step 1062), and the stripe control bits are cleared (step 1064).

Dirty pages are continually added to the dirty page list 910. When the dirty page list has crossed a previously registered fullness threshold, the AM 125 is notified (1070). If the dirty page list exceeds 80% full, the hypervisor 115 can force the TVM 135 to yield its time slice in the virtual environment (1072). This will prevent the dirty page list from overflowing while the AM 125 completes whatever processing that it is doing that is preventing it from responding to the dirty page list almost full condition.

The AM 125 then instructs the TVM 135 to pause (step 1075). The TVM 135 pauses (step 1076) and the hypervisor 115 detects the completion of the TMV pause (step 1077) and notifies the AM 125 that the TVM 135 is paused (step 1078).

The AM can now complete the preprocessing of the dirty page list 910 and begin transfer of dirty pages 950 from TVM 135 into the AM 125 (step 1080). The processing of the dirty page list 910 is divided between the virtual CPUs of the AM 125. The hypervisor 115, which also runs on multiple virtual CPUs, is given a section of the dirty page list 910 to process by each of the AM virtual CPUs. For each entry in the dirty page list 910 that the hypervisor 115 processes, there are 64 stripe control bits. Each bit controls the copying of 64 bytes of memory. If the stripe control bit is set, a highly optimized copy routine is used to copy a single 64 byte stripe of data from the referenced page of the memory 950 of the TVM 135 into the referenced page of the buffer cache 930 of the AM 125. If the stripe control bit is clear, an optimized comparison is run between the memory 950 of the TVM 135 and the AM 125 buffer cache 930. If the comparison completes and all 64 bytes match, that stripe is complete. If the stripe miscompares, the stripe starting from the first miscomparing byte to the end of the stripe is copied from the memory 950 of the TVM 135 to the buffer cache 930 of the AM 125. At the completion of the miscompare copy, the bit for that stripe is set in the dirty page table 910. When the hypervisor 115 has completed processing of the dirty page list 910, the AM buffer cache 930 has been updated with all the memory changes that have occurred in the memory 950 of TVM 135. The stripe control bits in the dirty page list 910 indicate all the unique stripes of memory that must be included in the checkpoint.

The AM 125 instructs the hypervisor 115 to reset the dirty page tracking mechanism (step 1085), which the hypervisor does (step 1087). The reverse PTE list 920 is used to accelerate this process. The hypervisor 115 changes the state of the referenced PTEs from Read Write back to Read Only. Once the PTE 940 has been reset and the AM 125 has used or captured the stripe control information from the dirty page list 910, the hypervisor can instruct the TVM 135 to continue execution (step 1090), and the TVM resumes operation (step 1095). The reset of the PTE 940 can occur any time after TVM 135 is reported as being paused by the hypervisor 115 (step 1078).

The system described above was designed to provide improved, fault tolerant performance for the guest environment running on the TVM 135. To achieve this, a number of techniques were employed. First, the AM 125 is SMP, with the checkpoint algorithm being broken into many threads of overlapped execution. In particular the modified page list processing happens in parallel across many processors. Second, the modified page list processing in the hypervisor 115 is optimized for performance, and a very efficient compare/copy algorithm is used to copy modified pages out of the TVM's memory space. According to this algorithm, the AM 125 gets a list of modified pages and attaches a buffer pointer to every entry in the list. The pointer points to a location in the cache memory of the AM 125, such as a previously sent page or a new page. For a previously-sent page, the AM 125 looks for parts of pages that were modified. The modified page is divided into stripes (e.g., 16 stripes), and only stripes that have been modified are copied. This may be accomplished by using a streaming compare process and, when the compare fails, using a streaming copy process to overwrite the buffer while flagging pieces that are being overwritten.

Other techniques include optimizing the modified page tracking algorithm to efficiently record modified pages, and to efficiently reset the algorithm using reverse lists into the page tables. In addition, the AM/hypervisor interface is optimized to use shared memory pages to reduce overhead. Also, the AM/hypervisor uses a modified page cache to eliminate non-changes from the modified page list. Memory that is frequently modified back to its original value is not included in a checkpoint (spinlocks are common examples).

A modified page may be divided into 64 byte stripes, with only the stripes that have changed being included in the checkpoint. As noted above, data compression algorithms can be applied on the fly to the modified pages queued for transmission in parallel with transmission of uncompressed or previously compressed pages. The TVM 135 of the primary system is only paused while the modified pages are being copied from the TVM to AM memory. Checkpoint transmission is overlapped with TVM operation.

In general, checkpoints are generated to optimize I/O response time and to control dirty page list length. Also, checkpoint data is reduced to limit required network bandwidth between systems and to shorten the interval between checkpoints.

A number of implementations have been described. Nevertheless, it will be understood that various modifications may be made without departing from the spirit and scope of the claims. Accordingly, other implementations are within the scope of the following claims.

What is claimed is:

1. A computer system configured to provide fault tolerance, the computer system comprising a first host system and a second host system, wherein the first host system comprises a first processor and a memory and wherein the first processor is programmed to:
monitor a number of portions of memory of the first host system that have been modified by a guest running on the first host system and, upon determining that the number of portions exceeds a threshold level, determine that a checkpoint needs to be created, and upon determining that the number of portions does not exceed the threshold level, determine that no checkpoint needs to be created and return to monitoring the number of portions of memory that have been modified;
upon determining that the checkpoint needs to be created, pause operation of the guest and generate checkpoint data; and
after generating the checkpoint data, resume operation of the guest and transmit the checkpoint data to the second host system;
wherein operation of the guest is resumed while the checkpoint data is being transmitted to the second host system, and
wherein the threshold level is a predetermined number of portions of memory.

2. The computer system of claim 1, wherein the first host system comprises multiple processors generating the checkpoint data.

3. The computer system of claim 1, wherein the checkpoint data includes data corresponding to all portions of memory of the first host system that have been modified since a previous checkpoint was generated.

4. The computer system of claim 3, wherein the checkpoint data also includes data representing an operating state of the first host system.

5. The computer system of claim 1, wherein the first host system is further programmed to determine that a checkpoint needs to be created based on network I/O activity of the guest running on the first host system.

6. The computer system of claim 5, wherein the first processor of the first host system is further programmed to determine that a checkpoint needs to be created when the duration of a time period since a last previous checkpoint was created exceeds a specified level.

7. The computer system of claim 1, wherein the first processor of the first host system is programmed to monitor a number of portions of memory of the first host system that have been modified by a guest running on the first host system by:
setting permissions for all pages of memory to be read only such that a fault is generated when a page is accessed for modification; and
in response to a fault generated by attempted modification of a page of memory set to be read only:
adding the page to a list of pages that have been modified;
setting the permissions for the page to be read/write; and
allowing the modification to proceed.

8. The computer system of claim 7, wherein, in response to a fault generated by attempted modification of a page of memory set to be read only, the first processor of the first host system is further programmed to add an entry corresponding to the page to a list that is used in setting permissions for all pages of memory to be read only when a checkpoint is generated.

9. A computer system configured to provide fault tolerance, the computer system comprising a first host system and a second host system, wherein the first processor of the first host system is programmed to:
monitor network I/O activity by a guest running on the first host system and, upon determining that a threshold level of network I/O activity has occurred, determine that a checkpoint needs to be created, and upon determining that the number of portions does not exceed the threshold level, determine that no checkpoint needs to be created and return to monitoring the number of portions of memory that have been modified;
upon determining that the checkpoint needs to be created, pause operation of the guest and generate checkpoint data; and
after generating the checkpoint data, resume operation of the guest and transmit the checkpoint data to the second host system;
wherein operation of the guest is resumed while the checkpoint data is being transmitted to the second host system.

10. A method of implementing a fault tolerant computer system using a first host system comprising a first processor and a memory and a second host system, the method comprising, at the first host system:
monitoring, using the first processor, a number of portions of memory of the first host system that have been modified by a guest running on the first host system and, upon determining that the number of portions exceeds a threshold level, determining that a checkpoint needs to be created, and upon determining that the number of portions does not exceed the threshold level, determine that no checkpoint needs to be created and return to monitoring the number of portions of memory that have been modified;

upon determining that the checkpoint needs to be created, pausing operation of the guest and generating checkpoint data; and after generating the checkpoint data, resuming operation of the guest and transmitting the checkpoint data to the second host system;

wherein operation of the guest is resumed while the checkpoint data is being transmitted to the second host system, and wherein the threshold level is a predetermined number of portions of memory.

11. The method of claim 10, wherein the first host system comprises multiple processors generating the checkpoint data.

12. The method of claim 10, wherein the checkpoint data includes data corresponding to all portions of memory of the first host system that have been modified since a previous checkpoint was generated.

13. The method of claim 12, wherein the checkpoint data also includes data representing an operating state of the first host system.

14. The method of claim 10, further comprising determining that a checkpoint needs to be created based on network I/O activity of the guest running on the first host system.

15. The method of claim 14, further comprising determining that a checkpoint needs to be created when the duration of a time period since a last previous checkpoint was created exceeds a specified level.

16. The method of claim 10, wherein monitoring a number of portions of memory by the first processor of the first host system that have been modified by a guest running on the first host system comprises:

setting permissions for all pages of memory to be read only such that a fault is generated when a page is accessed for modification; and in response to a fault generated by attempted modification of a page of memory set to be read only:

adding the page to a list of pages that have been modified;
setting the permissions for the page to be read/write; and
allowing the modification to proceed.

17. The method of claim 16, further comprising, in response to a fault generated by attempted modification of a page of memory set to be read only, adding an entry corresponding to the page to a list that is used in setting permissions for all pages of memory to be read only when a checkpoint is generated.

18. The system of claim 7 wherein the permission of the page is reset using a reverse page table entry list.

19. The method of claim 16 further comprising the step of resetting the permission of the page using a reverse page table entry list.

* * * * *